May 4, 1926.

E. E. HUDDLESTON

LICENSE PLATE HOLDER

Filed June 29, 1925

1,583,465

Inventor
E. E. Huddleston
By C. A. Snow & Co.
Attorneys

Patented May 4, 1926.

1,583,465

UNITED STATES PATENT OFFICE.

EDWARD E. HUDDLESTON, OF BECKLEY, WEST VIRGINIA.

LICENSE-PLATE HOLDER.

Application filed June 29, 1925. Serial No. 40,317.

*To all whom it may concern:*

Be it known that I, EDWARD E. HUDDLESTON, a citizen of the United States, residing at Beckley, in the county of Raleigh and State of West Virginia, have invented a new and useful License-Plate Holder, of which the following is a specification.

The present invention has reference to a combined license plate and holder, the primary object of the invention being to provide a license plate holder which will reflect light rays through openings formed in the license plate to illuminate the numbers and letters thereon.

An important object of the invention is the provision of brackets at the rear of the body portion of the device whereby the lamps employed within the box or holder will be securely held against movement.

Another object of the invention is to provide a license plate holder wherein the license plate may slide to its active position within the license plate holder, novel means being provided at the end of the plate for securing the plate against movement.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
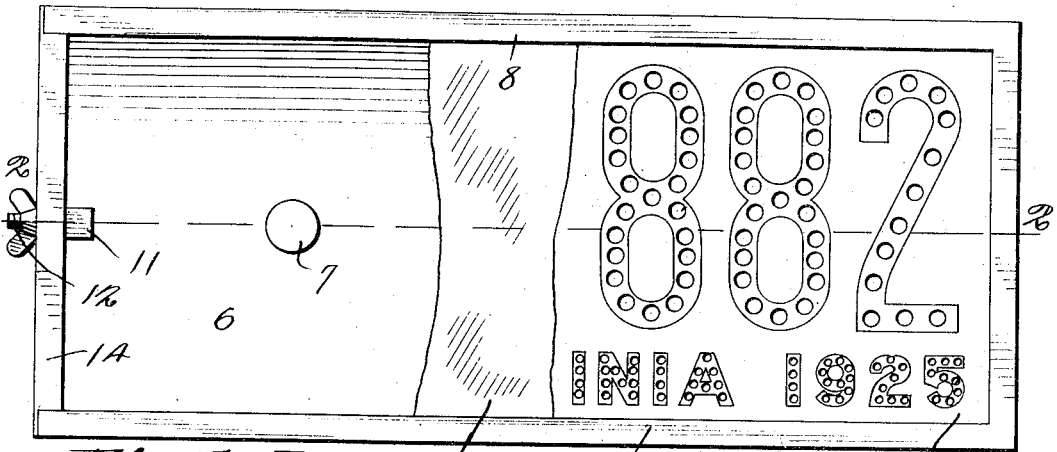
Figure 1 is an elevational view of a license plate holder constructed in accordance with the present invention.

Referring to the drawings in detail, the device includes a box-like body portion 5, the rear wall thereof being curved as at 6 providing a reflecting surface to project the light rays from the bulb 7 supported therein, outwardly.

The forward edges of the body portion are bent inwardly to provide flanges 8, which flanges provide a supporting surface for the license plate which is indicated at 9 and the colored glass member indicated at 10, thereby providing a structure to permit the plate and glass member to be slid into their active positions.

Secured at one end of the body portion is an angle iron indicated at 11 which angle iron is formed with an opening to accommodate the bolt 12 that passes therethrough, which bolt also passes through the end member 13 provided with a flange 14 designed to engage one end of the license plate and glass member supported therebehind to hold them in their active positions, in a manner to insure against the license plate rattling while in position.

At the rear of the body portion are provided bracket members 13' and 14' respectively, which bracket members are arranged in spaced relation with the body portion, the member 14' being supplied with an opening to accommodate the securing bolts 15 by means of which the device may be secured to the usual license bracket of a motor vehicle.

Figure 2:
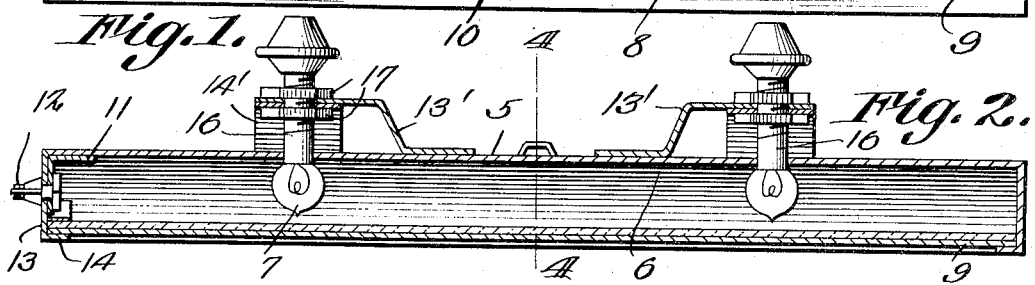
Figure 2 is a sectional view taken on line 2—2 of Figure 1.
Figure 3:
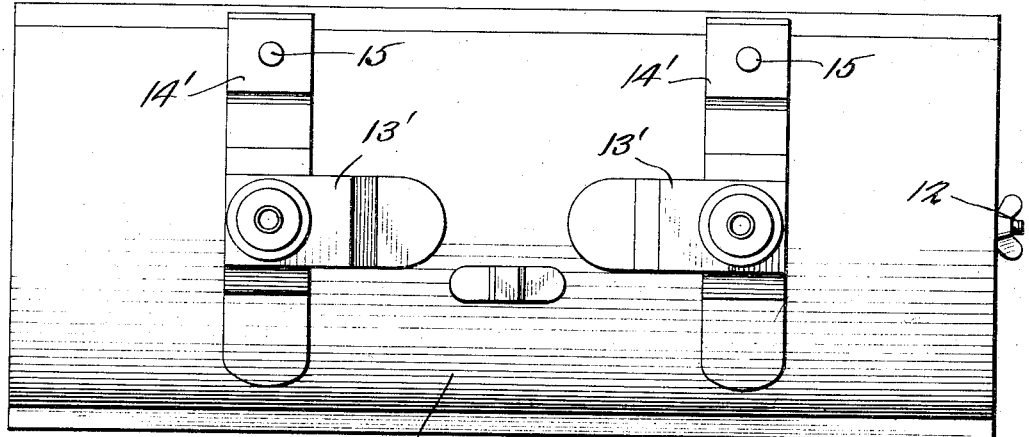
Figure 3 is a rear elevational view of the license plate holder.
Figure 4:
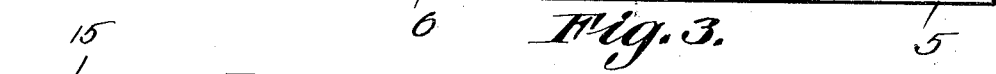
Figure 4 is a sectional view taken on line 4—4 of Figure 2.

As shown by Figure 2 of the drawing, a socket member is indicated at 16, which socket member is supported in a suitable opening formed in the bracket member 13 associated therewith, there being provided nuts 17 for clamping the socket member 16 in position.

The license plate proper which is indicated at 9 has perforations formed therein, which perforations allow light rays to pass from the body portion illuminating the numbers and letters of the license plate. Positioned behind the license plate is a transparent colored member such as glass or the like, so that the numbers and letters of the license plate will be made visible by the covering of the transparent member.

I claim:—

1. A license plate holder comprising a body portion, bracket members secured to the rear surface of the body portion and having portions thereof disposed in spaced relation with the body portion, lamp sockets having threaded portions extending through the brackets, nuts operating on the threaded portions and engaging opposite sides of the bracket members to hold the lamp sockets in position, a license plate removably supported by the body portion, and lamps within the body portion for illuminating the body portion.

2. A license plate holder comprising a body portion, bracket members secured to the rear surface of the body portion and having portions thereof arranged in spaced relation with the body portion, lamp sockets extending through the brackets, means cooperating with the lamp sockets for securing the lamp sockets into position, a removable license plate carried by the body portion, and lamps within the body portion to illuminate the license plate.

3. In a license plate holder, a box-like body portion, said body portion having an inwardly extended flange, said flange providing a supporting surface, a colored glass member positioned adjacent to the flange, a license plate positioned over the colored glass member and having indicating characters formed with openings to permit light rays to pass therethrough and outline the indicating characters, and a removable member adapted to engage the colored glass and license plate to secure the colored glass and license plate to the body portion.

In testimony that I claim the foregoing as my own, I have hereto affixed my signature.

EDWARD E. HUDDLESTON.